Sept. 12, 1961 J. F. SHERWOOD 2,999,724
DIFFERENTIAL DIAMETER RECIPROCATED SHAFT
AND SUPPORTING MEANS THEREFOR
Filed Aug. 22, 1960
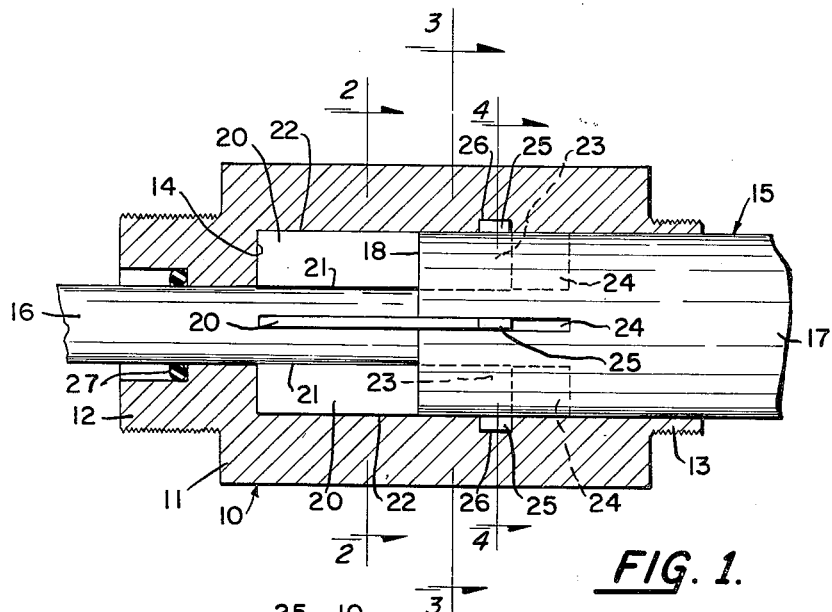
*FIG. 1.*
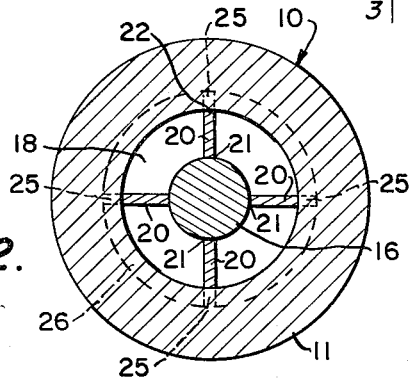
*FIG. 2.*
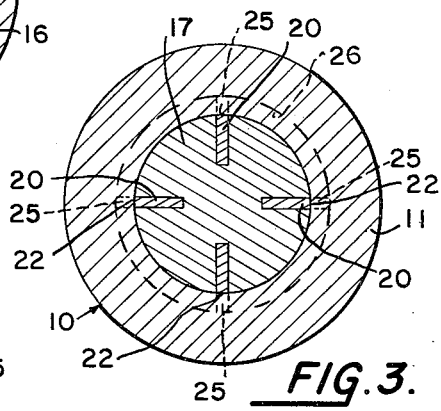
*FIG. 3.*
*FIG. 4.*
INVENTOR.
JOHN F. SHERWOOD
BY Bertha L. MacGregor
ATTORNEY

United States Patent Office 2,999,724
Patented Sept. 12, 1961

2,999,724
DIFFERENTIAL DIAMETER RECIPROCATED SHAFT AND SUPPORTING MEANS THEREFOR
John F. Sherwood, P.O. Box 225, Rte. 2, Golden, Colo.
Filed Aug. 22, 1960, Ser. No. 51,201
6 Claims. (Cl. 308—4)

This invention relates to a differential diameter reciprocated shaft and supporting means therefor. The shaft is adapted to actuate mechanisms such as dampers, shutters, valves, pumps and other devices.

The object of the invention is to provide a reciprocated shaft which is efficient for its intended purposes, capable of traveling predetermined distances and of exerting required power to perform its work but occupying exceptionally small diameter space in a pressure cylinder or other housing unit.

The shaft embodying my invention comprises a piston or plunger portion of small diameter and a work engaging portion of larger diameter, preferably integrally formed. The small diameter piston portion of the shaft, per se, has less power exerting capacity than is required to perform its intended function, but due to the provision of the novel supporting means herein shown and described, the shaft is automatically reinforced and its load capacity is greatly enhanced.

The shaft may be reciprocated by various means, including mechanical, hydraulic and other pressure exerting means. One such pressure exerting means employs highly expansible and contractible material in a high pressure cylinder. In that embodiment of the invention, it is particularly advantageous to employ an exceptionally small diameter piston or plunger in the high pressure cylinder, in order to obtain relatively long travel of the shaft by relatively small displacement of the expansible material. By the use of my invention, it is possible to employ a piston or plunger substantially smaller in diameter than the smallest conventional shaft capable of performing the specified work. A conventional shaft of uniformly small diameter throughout its length, comparable to the diameter of the piston portion of the shaft of this invention, would bend or break under the pressure and strain which can be imposed upon my shaft assembly without injury.

I have ascertained by experimentation that the piston portion of my shaft, while operating within a high pressure cylinder, is subjected to uniform pressure throughout the entire area of its surface, and therefore great pressure can be applied to a very small diameter shaft without resultant bending or breaking. However, when such a small diameter shaft is forced to travel outwardly of the cylinder and to exert the applied pressure against mechanism to be actuated by the shaft, it is not protected by the pressures existing in the pressure cylinder and consequently bends or breaks under the strain. This difficulty has been obviated by my invention, in which the differential diameter shaft is supported by means which automatically reinforces the small diameter piston portion when and to the extent that it travels outwardly of the high pressure cylinder.

The advantageous use of the shaft and supporting means of my invention is not confined to actuation by expansible means in a high pressure cylinder. Wherever limited space or other conditions make desirable the use of a small diameter piston or plunger connected to or integral with a larger diameter work shaft for actuating mechanism, my differential diameter reciprocated shaft and supporting means therefor insure efficient operation without bending or distortion of the shaft notwithstanding the application of load thereto which the small diameter shaft could not carry without the supporting means herein shown and described.

In the drawings:

FIG. 1 is a longitudinal, vertical sectional view, on an enlarged scale, of a cylindrical housing in which are mounted a differential diameter shaft and supporting means therefor embodying my invention, the opposite ends of the shaft being broken away.

FIGS. 2, 3 and 4 are transverse, vertical sectional views in the planes of the lines 2—2, 3—3, and 4—4, respectively, on FIG. 1, looking in the direction indicated by the arrows.

A housing, indicated as a whole at 10, comprises a cylindrical hollow body 11, provided with reduced diameter externally threaded end collars 12, 13. The body 11 forms a cylindrical chamber closed at one end by the wall 14 which is integral with the body 11 and collar 12. The end wall 14 is provided with a central opening for reception of part of a shaft 15 which is slidable through said opening.

The shaft 15 comprises a small diameter piston or plunger portion 16 and a concentric larger diameter work engaging portion 17 preferably integral with each other. The inner end surface of the shaft portion 17 adjacent the inner end of the piston shaft 16 is indicated at 18. The piston portion 16 is smaller in diameter than the chamber in housing 11, while the work engaging larger diameter portion 17 of the shaft fits reciprocably within the housing 11 and extends outwardly beyond the collar 13 to engage mechanism (not shown) to be actuated by the shaft 15.

The shaft is supported in the housing, and the small diameter piston portion 16 is reinforced by stationary guide members, preferably four in number. Each guide member comprises a guide plate 20 having flat parallel side surfaces, longitudinally disposed, located in equally spaced relation circumferentially of the shaft 16. The longitudinal edges of the guide plates 20 are concentric to the shaft 16, as indicated at 21, 22, respectively, the width of the plates between said edges being equal to the radial space between the shaft 16 and the inner surface of the cylindrical body 11. The length of each guide plate 20 is such that one end edge abuts the end wall 14 of the housing and the opposite end portion 23 extends into a radial slot 24 in the shaft 17. Said slots 24 extend from the shaft surface 18 longitudinally into the shaft 17. Each guide plate 20 has an ear or radial projection 25 on its edge 22 projecting into an annular groove 26 formed in the inner surface of the housing 11 whereby the guide plates are held stationarily in the housing chamber in reinforcing positions relatively to the piston shaft 16.

The free end of the piston shaft 16, shown here as broken away, may be connected to reciprocating mechanism or movement-imparting means of various kinds. It may extend into a high pressure cylinder (not shown) which may be mounted on the collar 12. Such a cylinder may contain thermally controlled highly expansible material which when heated exerts pressure on the shaft 16 and causes it to travel from left to right. Such thermally controlled expansible means for actuating mechanism is shown and described in my copending application, Serial No. 51,110, filed August 22, 1960.

When pressure means is employed to actuate the shaft 15, whether expansible, hydraulic or other, a seal 27 is installed adjacent the outer surface of the end wall 14 of the housing 10 as shown in the collar 12.

As previously mentioned, the use of an exceptionally small diameter shaft to perform relatively heavy work may be necessitated by lack of space or to obtain certain length of travel of the shaft by displacement of a small amount of expansible or pressurized material in a pressure cylinder. For example, I have employed a ⅛ inch or smaller diameter piston shaft integral with a ⅜ inch diameter work shaft having three to four inches longitudinal movement for actuating a damper requiring 11 pounds pressure. Such a load could not be carried by a conventional shaft of uniform ⅛ inch diameter, but the provision of my supporting guide members for automatically reinforcing the small diameter shaft insures efficient operation without bending or breaking of the shaft.

The specific construction and arrangement of parts herein illustrated are for exemplary purposes only and it should be understood that the principles of the invention embrace variations and modifications thereof which come within the scope of the following claims.

I claim:

1. A differential diameter reciprocated shaft and supporting means therefor comprising a cylindrical housing, a shaft reciprocably mounted in the housing having a piston portion smaller in diameter than the internal diameter of the housing and a work shaft portion larger in diameter than the piston portion, and a plurality of stationary supporting guides spaced circumferentially of the piston portion of the shaft and extending radially between said portion and the housing in reinforcing relationship to the piston shaft.

2. A differential diameter reciprocated shaft and supporting means therefor comprising a cylindrical housing, a shaft reciprocably mounted in the housing having a piston portion smaller in diameter than the internal diameter of the housing extending outwardly of one end of the housing, and a work shaft portion larger in diameter than the piston portion extending outwardly of the opposite end of the housing, said work shaft portion being provided with longitudinally extending slots spaced circumferentially of the shaft, and a plurality of stationary supporting guides spaced circumferentially of the piston portion of the shaft, extending radially between the piston portion and the housing in reinforcing relationship to said piston shaft, the slots in the work shaft portion being longitudinally aligned with said supporting guides and adapted to slidably engage said guides.

3. A differential diameter reciprocated shaft and supporting means therefor comprising a cylindrical housing, a shaft reciprocably mounted in the housing having a piston portion smaller in diameter than the internal diameter of the housing and a work shaft portion larger in diameter than the piston portion integral therewith, the work shaft portion being provided with a plurality of parallel slots extending longitudinally from the end surface of the work shaft adjacent the piston shaft, and a plurality of stationary supporting guides each comprising a flat parallel sided plate extending radially of the housing and into one of the slots of the work shaft, and having parallel longitudinal edges one of which engages the peripheral surface of the piston shaft and the other contacts the inner surface of the housing, said supporting guides reinforcing the piston shaft in the housing.

4. The structure defined by claim 1 in which the housing and each of the supporting guides are provided with cooperating means preventing longitudinal movement of the guides relatively to the housing.

5. The structure defined by claim 3 in which the housing and each of the supporting guides are provided with cooperating means preventing longitudinal movement of the guides relatively to the housing.

6. The structure defined by claim 1 in which the housing is provided with an annular groove on its inner surface and the supporting guides have radially extending ears engaged in said groove which prevent longitudinal movement of the guides relatively to the housing.

No references cited.